US 8,293,076 B2

(12) United States Patent
Shimizu et al.

(10) Patent No.: US 8,293,076 B2
(45) Date of Patent: Oct. 23, 2012

(54) METHOD FOR PRODUCING TRICHLOROSILANE AND METHOD FOR PRODUCING POLYCRYSTALLINE SILICON

(75) Inventors: Takaaki Shimizu, Niigata (JP); Kyoji Oguro, Niigata (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 1169 days.

(21) Appl. No.: 12/135,487

(22) Filed: Jun. 9, 2008

(65) Prior Publication Data

US 2009/0057129 A1 Mar. 5, 2009

(30) Foreign Application Priority Data

Sep. 5, 2007 (JP) ................................. 2007-229858

(51) Int. Cl.
   *B01D 3/34* (2006.01)
(52) U.S. Cl. ............................ 203/32; 423/342; 556/473
(58) Field of Classification Search .................... 203/32; 423/342; 556/473
   See application file for complete search history.

(56) References Cited

U.S. PATENT DOCUMENTS

| 3,704,104 | A | * | 11/1972 | Bawa et al. ................... 423/342 |
| 4,112,057 | A | * | 9/1978 | Lang et al. .................... 423/342 |
| 4,224,040 | A | * | 9/1980 | Gazzarrini et al. .............. 95/133 |
| 4,309,259 | A | * | 1/1982 | Sarma et al. ................... 204/164 |
| 4,340,574 | A | | 7/1982 | Coleman ...................... 423/347 |
| 4,409,195 | A | * | 10/1983 | Darnell et al. ................. 423/342 |
| 4,454,104 | A | * | 6/1984 | Griesshammer et al. ..... 423/349 |
| 4,481,178 | A | | 11/1984 | Kray |
| 4,526,769 | A | * | 7/1985 | Ingle et al. .................... 423/342 |
| 5,118,485 | A | * | 6/1992 | Arvidson et al. ............. 423/342 |
| 5,422,088 | A | | 6/1995 | Burgie et al. |
| 6,932,954 | B2 | * | 8/2005 | Wakamatsu et al. .......... 423/350 |
| 7,033,561 | B2 | * | 4/2006 | Kendig et al. ................. 423/349 |
| 2004/0052716 | A1 | | 3/2004 | Wakamatsu et al. |
| 2004/0131528 | A1 | | 7/2004 | Kendig et al. |
| 2009/0098039 | A1 | * | 4/2009 | Wakamatsu et al. .......... 423/350 |

FOREIGN PATENT DOCUMENTS

| JP | 59-97519 | 6/1984 |
| JP | 1-313317 | 12/1989 |
| JP | 7-232910 | 9/1995 |
| JP | 9-118512 | 5/1997 |
| JP | 2004-532786 | 10/2004 |
| WO | WO 02/100776 A1 | 12/2002 |

OTHER PUBLICATIONS

Hurd, D., "The Vapor Phase Alkylation and Hydrogenation of Chlorosilanes", Journal of the American Chemical Society, vol. 67, pp. 1545-1548, ACS 1945.*
U.S. Appl. No. 12/190,229, filed Aug. 12, 2008, Shimizu, et al.
U.S. Appl. No. 12/190,151, filed Aug. 12, 2008, Shimizu, et al.
U.S. Appl. No. 12/203,395, filed Sep. 3, 2008, Shimizu, et al.

* cited by examiner

*Primary Examiner* — Robert A Hopkins
(74) *Attorney, Agent, or Firm* — Oblon, Spivak, McClelland, Maier & Neustadt, L.L.P.

(57) ABSTRACT

Methods for producing trichlorosilane, including: reacting a tetrachlorosilane containing substance with hydrogen at a temperature of 400° C. to 1,200° C. to obtain a mixture including silane, monochlorosilane, dichlorosilane, and trichlorosilane; removing impurities which are electrically active in a semiconductor crystal from the mixture; separating the trichlorosilane from the silane, monochlorosilane and dichlorosilane to obtain purified trichlorosilane; and circulating the silane, monochlorosilane and dichlorosilane obtained from the separating step into the reacting step.

9 Claims, 3 Drawing Sheets

METHOD FOR PRODUCING TRICHLOROSILANE AND METHOD FOR PRODUCING POLYCRYSTALLINE SILICON

BACKGROUND OF THE INVENTION

1. Field of the Invention

The present invention relates to a high-efficiency technology for producing trichlorosilane (TCS), and to a technology for using the high-efficiency technology in a process for producing polycrystalline silicon.

2. Description of the Related Art

In a process for producing high-purity polycrystalline silicon of a semiconductor grade, generally a "Siemens method" of reducing a trichlorosilane (TCS) gas and depositing the product on a silicon rod has been widely used.

As for the Siemens method, National Publication of International Patent Application No. 2004-532786 (Patent document 1) discloses an invention relating to a method of producing polycrystalline silicon, which newly includes a step of converting disilane ($H_nCl_{6-n}Si_2$: n is a value of 0 to 6) that exists in a gaseous distillate coming out from a CVD process for producing polycrystalline silicon, into mono-silane, in a hydrogenation reaction vessel for converting tetrachlorosilane ($SiCl_4$:STC) into trichlorosilane ($SiHCl_3$:TCS). The method is evaluated to have advantages of enhancing a yield of a hydrogenation process by combining a hydrogenation reaction with a thermal decomposition reaction of disilane in the same reaction vessel which is the hydrogenation reaction vessel, and the like. TCS produced in the hydrogenation process is collected, and can be recycled to a step of depositing the polycrystalline silicon.

Incidentally, a by-product mixture produced when the polycrystalline silicon is deposited by reacting TCS with hydrogen also includes a poly-silane ($H_{2(n+1)-m}Cl_mSi_n$: n is an integer of 3 or 4 and m is an integer of 0 to 2(n+1)), other than disilane having a silicon atom number n of 2. Accordingly, when these poly-silanes can be effectively used, the by-product mixture produced in the step of depositing polycrystalline silicon is recycled as a material for producing the polycrystalline silicon, and more specifically, the by-product mixture is facilitated to be recycled as the TCS, and a yield of the production process is further enhanced.

In addition, the by-product produced when the polycrystalline silicon is deposited includes hyper-hydrogenated chlorosilane which is represented by dichlorosilane, in addition to the poly-silane. The hyper-hydrogenated chlorosilane is a by-product similarly produced also in the above described step of converting the STC into the TCS. Among the hyper-hydrogenated chlorosilanes, a hyper-hydrogenated chlorosilane which is contained in a gas exhausted when the polycrystalline silicon is deposited can be supplied to a CVD reactor together with an unreacted TCS, is circulated, and is effectively recycled. However, when the hyper-hydrogenated chlorosilane in an amount that exceeds a fixed amount of the supplied TCS is mixed with the supplied TCS, a quality of the polycrystalline silicon obtained through a deposition reaction is lowered, so that a range of an amount to be recycled is limited. However, it is obvious that the hyper-hydrogenated chlorosilane is potentially a recyclable silicon source.

In other words, a process of recirculating and using TCS, which is adopted in a conventional method of producing polycrystalline silicon including a method disclosed in Patent document 1, has a room to be improved in a process of converting the above described by-product mixture into TCS as a raw material for producing the polycrystalline silicon.

In addition, in order to produce high-purity polycrystalline silicon of a semiconductor grade, it is required to enhance the purity of TCS which is to be the raw material. As a result, it is needed to prepare a step for removing impurities in the TCS and the by-product which are circulated and used in the process for producing the polycrystalline silicon. Accordingly, it is extremely important from a practical standpoint to design the process so as to facilitate the removal of the impurities from the TCS and the by-product which are circulated and used in the process for producing the polycrystalline silicon.

SUMMARY OF THE INVENTION

The present invention is designed with respect to such a problem, and is directed at enabling the enhancement of the efficiency of a process for producing TCS by recycling hyper-hydrogenated chlorosilane contained in an exhaust gas produced in a step of hydrogenating STC, recycling hyper-hydrogenated chlorosilane contained in the exhaust gas produced when polycrystalline silicon is deposited so as not to lower the quality of the product, and further providing a method for efficiently producing polycrystalline silicon of high purity by recycling poly-silane produced in a step of depositing the polycrystalline silicon.

In order to solve such a problem, a method for producing trichlorosilane according to the present invention includes: a hydrogenation step of making a tetrachlorosilane (STC)-containing substance react with hydrogen to convert the substance into trichlorosilane (TCS); and a step of separating chlorosilane distillate discharged in the hydrogenation step into TCS and a mixture distillate containing hyper-hydrogenated chlorosilane, and circulating the mixture distillate containing the hyper-hydrogenated chlorosilane to the hydrogenation step.

The method for producing trichlorosilane according to the present invention can further include a step of removing impurities which are electrically active in a semiconductor crystal from the chlorosilane distillate discharged from the hydrogenation step, prior to the step of separating the mixture distillate containing the hyper-hydrogenated chlorosilane.

The method for producing the trichlorosilane according to the present invention may be constituted so as to supply the hyper-hydrogenated chlorosilane produced in a step of depositing polycrystalline silicon to the hydrogenation step.

Furthermore, in the method for producing the trichlorosilane according to the present invention, the tetrachlorosilane (STC)-containing substance may contain poly-silane ($H_{2(n+1)-m}Cl_mSi_n$: n is an integer of 2 to 4 and m is an integer of 0 to 2(n+1)) which is a by-product produced in the step of depositing the polycrystalline silicon.

The method for producing polycrystalline silicon according to the present invention includes a step of circulating TCS obtained in the method for producing trichlorosilane according to the present invention to a step for depositing the polycrystalline silicon, and making the TCS react with hydrogen.

The method for producing trichlorosilane according to the present invention includes separating a chlorosilane distillate which has been discharged from a hydrogenation step into TCS and a mixture distillate containing hyper-hydrogenated chlorosilane, and circulating the mixture distillate containing the hyper-hydrogenated chlorosilane to the hydrogenation step to circulate and recycle low boils by-products conventionally wasted in the process, so that the TCS can be produced with higher efficiency.

In addition, the method for producing trichlorosilane according to the present invention includes selectively removing impurities which are contained in chlorosilane and are electrically active in a semiconductor crystal, in a circulation cycle of the process for producing the TCS, and accordingly it is not necessary to take out a large amount of chlorosilane to the outside of the system when removing the impurities in the process of producing the TCS in order to purify the TCS.

The method further includes treating not only disilane having a silicon atom number n of 2, but also a mixture containing poly-silane having a silicon atom number n of 3 or more $H_{2(n+1)-m}Cl_mSi_n$: n is an integer of 2 or 4 and m is an integer of 0 to 2(n+1)) simultaneously in the above described hydrogenation step, and thereby can provide TCS with higher efficiency.

In addition, if such a method would be prepared to circulate the TCS obtained through a method for producing the TCS according to the present invention to a step of depositing polycrystalline silicon and make the TCS react with hydrogen, the method can produce the polycrystalline silicon at a higher yield.

DESCRIPTION OF THE PREFERRED EMBODIMENTS

A method for producing trichlorosilane according to the present invention will now be described below with reference to the drawings.

In the following description, polycrystalline silicon which has been produced by using trichlorosilane as a raw material obtained with the method according to the present invention will be described as high-purity polycrystalline silicon of a semiconductor grade, but the present invention is also effective for obtaining the polycrystalline silicon of a solar cell grade or the like.

Figure 1:
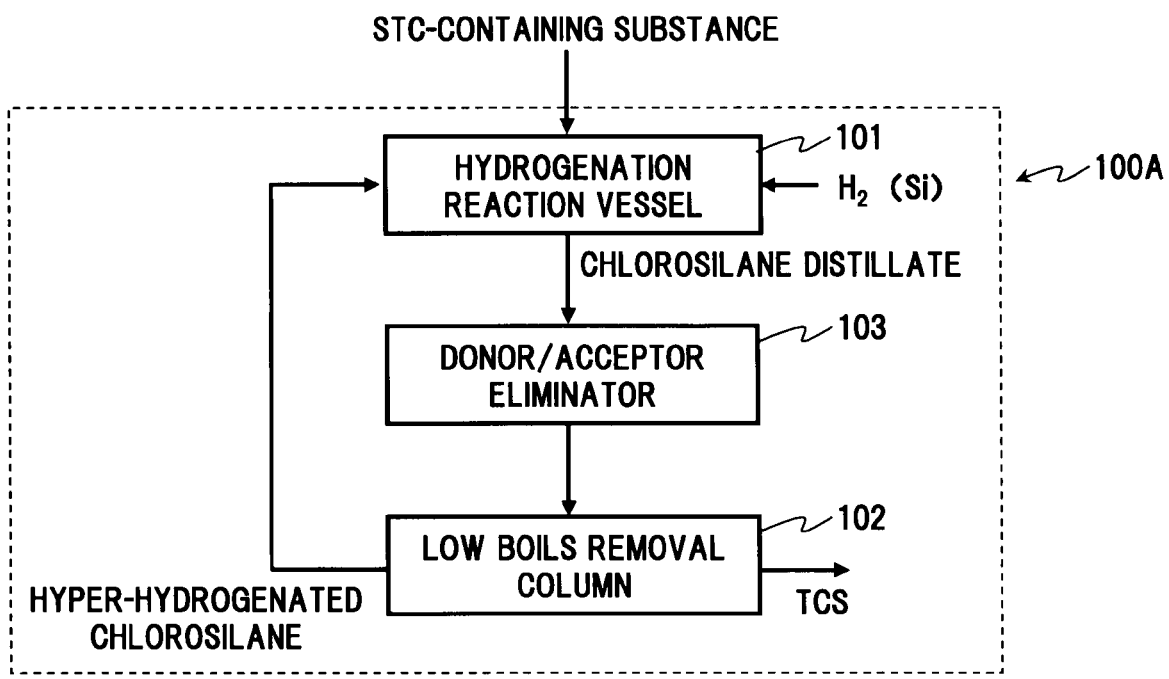
FIG. 1 is a view for describing a basic configuration (process) of a method for producing TCS according to the present invention.

[Basic configuration]: FIG. 1 is a view for describing a configuration example (process example) of a method for producing trichlorosilane according to the present invention. A process 100A for producing TCS includes: a hydrogenation step (hydrogenation reaction vessel 101) of making a tetrachlorosilane (STC)-containing substance react with hydrogen to convert the substance into trichlorosilane (TCS); and a step of separating chlorosilane distillate discharged in the hydrogenation step into TCS and a mixture distillate containing hyper-hydrogenated chlorosilane (low boils removal column 102), and circulating the mixture distillate containing the hyper-hydrogenated chlorosilane to the hydrogenation step (hydrogenation reaction vessel 101).

The process illustrated in FIG. 1 has a step of removing impurities (donor/acceptor eliminator 103) which are electrically active in a semiconducting crystal from the chlorosilane distillate discharged from the hydrogenation step, prior to the step of supplying the chlorosilane distillate discharged from the hydrogenation reaction vessel 101 to the low boils removal column 102. The donor/acceptor eliminator 103 is intended to remove the impurities in the chlorosilane distillate to purify the chlorosilane distillate, and consequently further purify the TCS which is the final product. The method for removing the impurities with the use of the donor/acceptor eliminator 103 will be described later.

After the donor/acceptor eliminator 103 has removed the impurities from hyper-hydrogenated chlorosilane containing TCS, the low boils removal column 102 distills the resultant hyper-hydrogenated chlorosilane in order to collect and separate the hyper-hydrogenated chlorosilane, and separates the hyper-hydrogenated chlorosilane into a hyper-hydrogenated chlorosilane rich mixture distillate containing comparatively less TCS and a TCS distillate.

Among them, the former (mixture distillate containing hyper-hydrogenated chlorosilane rich) is supplied and circulated to the hydrogenation reaction vessel 101. As a result, low boils by-products conventionally wasted is circulated and recycled in the process, which enhances a yield of TCS production.

On the other hand, the latter (TCS distillate) is collected as a product. In addition, when the above TCS distillate is further subjected to the distillation purification step, the TCS distillate is further purified. The TCS with higher purity may be circulated to a CVD process for depositing polycrystalline silicon, and reused as a raw material for producing the polycrystalline silicon.

Each process will now be described below.

[Hydrogenation step]: In a hydrogenation process, a STC-containing substance is subjected to a hydrogenation reaction to be converted into TCS. In the hydrogenation step, a reaction of converting the TCS to dichlorosilane ($SiH_2Cl_2$:DCS), a reaction of converting DCS to mono-chlorosilane (MCS) and a reaction of converting MCS to mono-silane ($SiH_4$:MS) in addition to the STC to TCS hydrogenation reaction occurs at the same time though the reaction amounts are little.

The reaction in the hydrogenation step is classified generally into a hydrogenation reaction in a comparatively high range of approximately 600 to 1,200° C. and a hydrogenation reaction in a comparatively low range of approximately 400 to 600° C. (for instance, under pressure of approximately 100 to 600 psig) (see, for instance, the above described Patent document 1 or Japanese Patent Laid-Open No. 58-217422 (Patent document 2)).

The hydrogenation reaction in the range of approximately 600 to 1,200° C. is a gas-phase homogenous reaction, and proceeds according to the following reaction formula (1).

$SiCl_4+H_2 \rightarrow SiHCl_3+HCl$                    Reaction formula (1):

In addition, the hydrogenation reaction in the range of approximately 400 to 600° C. is a fluidized bed reaction, and proceeds according to the following reaction formula (3) as a result of the following reaction formula (2).

$3SiCl_4+3H_2 \rightarrow 3SiHCl_3+3HCl$

$Si+3HCl \rightarrow SiHCl_3+H_2$                    Reaction formula (2):

$Si+2H_2+3SiCl_3 \rightarrow 4SiHCl_3$                    Reaction formula (3):

Accordingly, in the case of the hydrogenation reaction occurring in the range of approximately 600 to 1,200° C., it is unnecessary to supply silicon. However, in the case of the hydrogenation reaction occurring in the range of approximately 400 to 600° C., the silicon is supplied to the reaction vessel and the STC-containing substance is hydrogenated in the presence of the silicon.

When the STC-containing substance is subjected to the hydrogenation reaction conducted in a comparative low range of approximately 400 to 600° C. (under pressure of approximately 100 to 600 psig), and the hyper-hydrogenated chlorosilane circulated and recycled from a low boils removal column 102 is assumed to be DCS, a chemical reaction according to the following reaction formula (4) simultaneously proceeds together with the above described STC to TCS hydrogenation reaction in the hydrogenation reaction vessel 101.

$3SiH_2Cl_2 \rightarrow 2SiHCl_3 + 2H_2 + Si$     Reaction formula (4):

In the present invention, the by-products $H_2$ and Si produced in the above described reaction formula (4) can be used as one part of hydrogen and silicon to be supplied to a reaction vessel in which STC is hydrogenated into TCS.

On the other hand, when the STC-containing substance is subjected to the hydrogenation reaction conducted in a comparatively high range of approximately 600 to 1,200° C., and the hyper-hydrogenated chlorosilane is assumed to be DCS, a chemical reaction according to the following reaction formula (5) simultaneously proceeds together with the above described STC to TCS hydrogenation reaction occurring in the hydrogenation reaction vessel 101.

$SiH_2Cl_2 + HCl \rightarrow SiHCl_3 + H_2$     Reaction formula (5):

In the present invention, one part of a by-product HCl produced in the hydrogenation reaction for STC is used as HCl (HCl in left-hand side) which is a raw material in the above described reaction formula (5), and a by-product $H_2$ produced in the reaction can be used as one part of a hydrogenating material for STC.

The above described reaction formula (4) and (5) are shown on the assumption that the hyper-hydrogenated chlorosilane is the DCS, but other hyper-hydrogenated chlorosilanes can also be circulated (collected) to the hydrogenation step.

In addition, when the hydrogenation reaction is conducted in a comparatively low range of approximately 400 to 600° C., hydrogen chloride (HCl) may be supplied to the inside of the hydrogenation reaction vessel from the outside at the same time, though the passage is not shown in the figure.

The hyper-hydrogenated chlorosilane is contained not only in the above described hydrogenation step for STC, but also in an exhaust gas which is a by-product produced in a CVD process for obtaining polycrystalline silicon, which will be described later. The latter hyper-hydrogenated chlorosilane can also be effectively used as a raw material of TCS by being recirculated to the above described hydrogenation step of STC.

[Donor/acceptor eliminator]: A main object of preparing a donor/acceptor eliminator 103 is to selectively remove impurities which are electrically active in a semiconductor crystal, from TCS to be produced: and more particularly, is to make the TCS into a raw material for producing high-purity polycrystalline silicon by selectively removing impurities (P, As and the like) which act as a donor and impurities (B, Al and the like) which act as an acceptor in silicon crystal, from the TCS to an ultratrace amount.

Particularly when a by-product DCS produced in a production process is circulated and recycled without being removed from a system as is described in Japanese Patent Laid-Open No. 10-316413 (Patent document 3), impurities which have a close boiling point to the above low boils by-product and are electrically active are also accumulated in the system without being removed, and can cause a problem with the quality. A TCS process in the present invention has the donor/acceptor eliminator 103 installed in the circulation cycle, and accordingly does not need to take out a large amount of chlorosilane to the outside of the system when selectively removing the above described impurities (donor impurities and acceptor impurities) from the process for producing TCS in order to purify the TCS.

There are adoptable methods for removing the impurities, which include: a method of removing impurities by producing an adduct with an organic substance containing an element having a lone electron-pair such as thiophenol and benzaldehyde (See U.S. Pat. No. 3,126,248 specification (Patent document 4) and U.S. Pat. No. 3,252,752 specification (Patent document 5)); a method of removing impurities through a chemical reaction of forming an Si—O—B bond or an Si—O—P bond in an atmosphere containing a very small amount of oxygen (See Japanese-Patent-Application No. 58-500895 (Patent document 6)); a method of removing impurities by making the impurities contact with a metal oxide such as silica gel and alumina gel which are hydrated (See U.S. Pat. No. 4,112,057 specification (Patent document 7)); a method of removing impurities by making the impurities contact with an aqueous solution of an inorganic salt such as $TiCl_4$ and $FeCl_3$ (See Japanese Patent Laid-Open No. 4-300206 (Patent document 8)); a method of removing impurities by making the impurities contact with a fluoride salt of an alkali or alkaline earth element (See Japanese Patent Laid-Open No. 2001-2407 (Patent document 9)); and a method of simultaneously non-volatilizing and fixing both impurities which act as a donor and an acceptor by dissolving oxygen into a chlorosilane liquid and making the impurities react with benzaldehyde.

Figure 2:
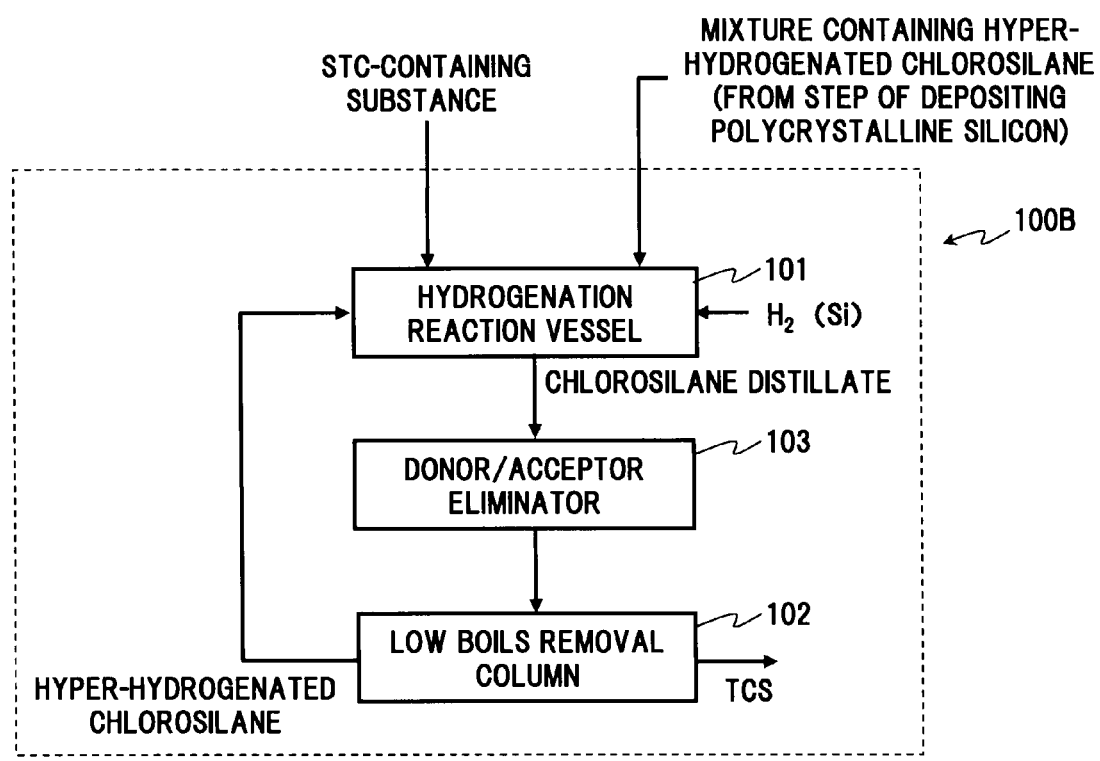
FIG. 2 is a view for describing another configuration example of a method for producing TCS according to the present invention.

[Another configuration example]: FIG. 2 is a view for describing another configuration example (process example) of a method for producing trichlorosilane according to the present invention. In the process 100B for producing the TCS, a mixture containing a poly-silane ($H_{2(n+1)-m}Cl_mSi_n$: n is an integer of 2 or 4 and m is an integer of 0 to 2(n+1)) is supplied to a hydrogenation reaction vessel 101 together with a mixture containing hyper-hydrogenated chlorosilane, which has been distillated from a low boils removal column 102.

Here, the poly-silane-containing mixture to be supplied to the hydrogenation reaction vessel 101 is, for instance, a by-product mixture produced in a CVD step of depositing polycrystalline silicon.

In a CVD reactor used for depositing polycrystalline silicon, the polycrystalline silicon is deposited on a silicon rod (seed) heated by electrification through a reduction reaction (Siemens method) of TCS due to a reaction of trichlorosilane ($SiHCl_3$:TCS) with hydrogen ($H_2$), but in the CVD reactor, there exist dichlorosilane ($SiH_2Cl_2$:DCS) produced in the reduction reaction, tetrachlorosilane ($SiCl_4$:STC), a poly-silane, and a by-product mixture containing granular silicon and the like, in addition to TCS which has remained in an unreacting state. Here, the poly-silane is generally expressed by the above described chemical formula $H_{2(n+1)-m}Cl_mSi_n$. TCS is a poly-silane in the case of n=1 and m=3, DCS is a poly-silane in the case of n=1 and m=2, and STC is a poly-silane in the case of n=1 and m=4.

The process can supply a by-product mixture produced in the step of depositing the polycrystalline silicon (process of producing polycrystalline silicon) to the hydrogenation reaction vessel 101 together with a mixture which contains hyper-hydrogenated chlorosilane and is distillated from a low boils removal column 102, and can produce a chlorosilane effluent.

EXAMPLE

Figure 3:
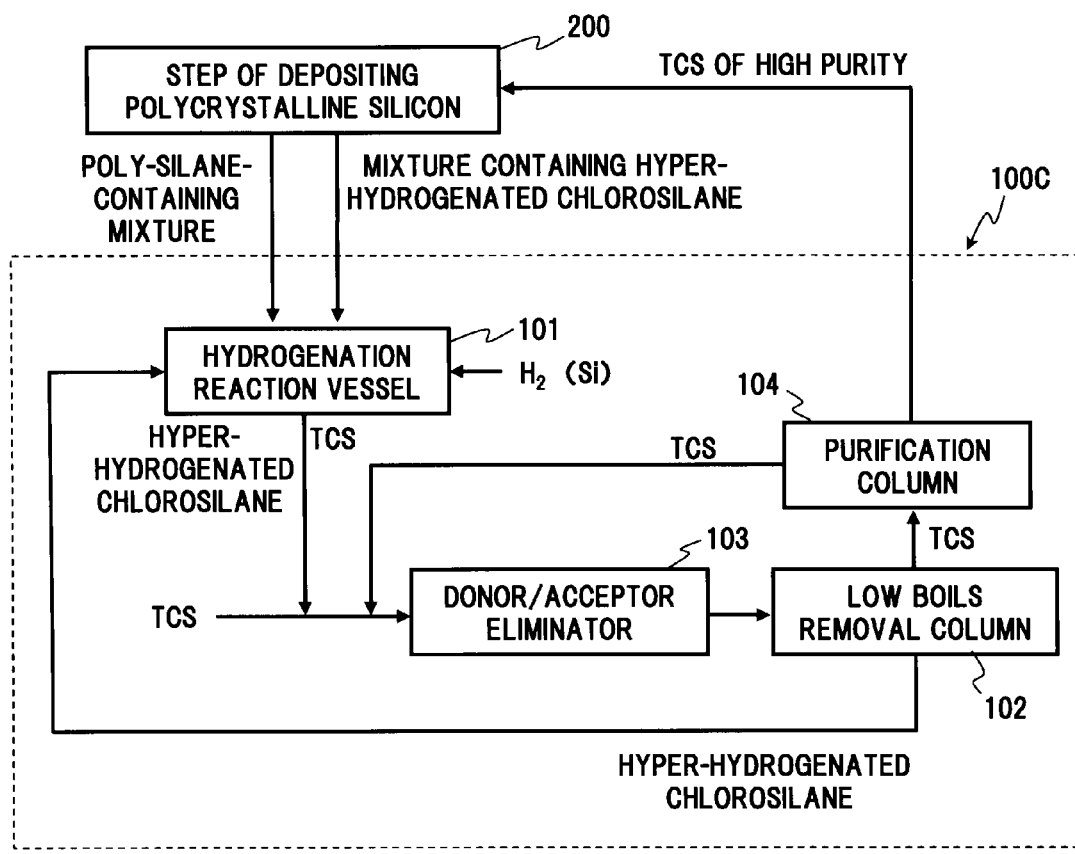
FIG. 3 is a view for describing a commercial process example of a method for producing polycrystalline silicon according to the present invention.

FIG. 3 is a view for describing an example of a commercial process for a method for producing polycrystalline silicon according to the present invention. The process for producing polycrystalline silicon includes a step of circulating TCS obtained in a process 100C for producing trichlorosilane according to the present invention to a step (CVD process) 200 for depositing polycrystalline silicon, and making the TCS react with hydrogen.

STC containing 0.37% poly-silanes as a by-product mixture discharged from the step 200 for depositing polycrystalline silicon and a mixture containing hyper-hydrogenated chlorosilane having a composition including 1.2 wt % MCS, 50.7 wt % DCS and 48.1 wt % TCS were supplied to a hydrogenation reaction vessel 101.

The STC containing the 0.37% poly-silanes as the by-product mixture discharged from the step 200 for depositing polycrystalline silicon and hydrogen blended by a mole ratio of 1:2 in a gaseous state were supplied to a hydrogenation reaction vessel 101 in which metallic silicon fluidizes, together with the mixture containing hyper-hydrogenated chlorosilane circulated from a low boils removal column 102, and the STC was hydrogenated at a reaction temperature of 520° C. under a reaction pressure of 2.5 Mpag. As a result of the hydrogenation reaction, a reaction product including 0.02 wt % MCS, 0.74 wt % DCS, 23.10 wt % TCS and 76.14 wt % STC was obtained.

TCS (68 kg/hr) from the outside of the system and TCS (42 kg/hr) distillated from the bottom of a purification column (not shown) in addition to the reaction product were supplied to an isolation column (not shown). In the isolation column, a distillate containing hyper-hydrogenated chlorosilane having a composition consisting of 0.07 wt % MCS, 2.86 wt % DCS and 97.07 wt % TCS was distillated from the top of the column, and was supplied to a donor/acceptor eliminator 103.

The donor/acceptor eliminator 103 is a vessel equipped with a stirrer. Donor/acceptor impurities were selectively solidified as non-volatile adducts in the vessel by introducing benzaldehyde into the vessel at a rate of 1 kg/hr while bubbling a nitrogen gas containing 1.6 vol % oxygen by concentration into the reaction mixture, at a reaction temperature of 30° C. under a reaction pressure of 0.2 Mpag for a residence time of 1 hour.

The treated liquid was continuously discharged to an evaporator (not shown) from the donor/acceptor eliminator 103, and evaporated chlorosilanes were supplied to a low boils removal column 102 in a vapor state.

In the low boils removal column 102, a mixture containing 0.8 wt % MCS, 33.8 wt % DCS, 65.4 wt % TCS was circulatingly supplied to the hydrogenation reaction vessel 101 from the top of the tower, and TCS was supplied to a purification column 104 from the bottom of the tower.

In the purification column 104, high-purity TCS was distillated from the top of the tower, and was supplied to the step 200 for producing the polycrystalline silicon. On the other hand, from the bottom of the purification column 104, TCS was circulatingly supplied to the isolation column.

Polycrystalline silicon obtained from the high-purity TCS distillated from the top of the above described purification column 104 through a deposition step by the Siemens method was high-purity polycrystalline silicon containing such a low concentration of impurities as 0.021 ppba of a donor and 0.007 ppba of an acceptor.

As described above, a method according to the present invention includes circulating and recycling a low boils by-product conventionally wasted from a hydrogenation step and polycrystalline step in the process, which results in enhancing a yield of TCS production.

What is claimed is:

1. A method, comprising:
reacting a tetrachlorosilane comprising substance with hydrogen at a temperature of from 400° C. to 1,200° C. to obtain a mixture comprising silane, monochlorosilane, dichlorosilane, and trichlorosilane;
removing impurities which are electrically active in a semiconductor crystal from the mixture;
separating the trichlorosilane from the silane, monochlorosilane and dichlorosilane to obtain purified trichlorosilane;
circulating the silane, monochlorosilane and dichlorosilane obtained from said separating into said reacting; and
supplying a second mixture comprising dichlorosilane and a poly-silane represented by $H_{2(n+1)-m}Cl_mSi_n$, which is a by-product produced by depositing polycrystalline silicon onto a substrate, to said reacting,
wherein n is an integer of 2 to 4 and m is an integer of 0 to 2(n+1).

2. The method according to claim 1, wherein the tetrachlorosilane comprising substance comprises a poly-silane represented by $H_{2(n+1)-m}Cl_mSi_n$, where n is an integer of 2 to 4 and m is an integer of 0 to 2(n+1), which is a by-product produced by depositing polycrystalline silicon onto a substrate.

3. The method according to claim 1, further comprising
reacting trichlorosilane obtained from said separating with hydrogen to deposit polycrystalline silicon on a substrate.

4. The method according to claim 1, wherein said reacting is carried out at a temperature of from 600 to 1,200° C.

5. The method according to claim 1, wherein said reacting is carried out at a temperature of from 400 to 600° C., at a pressure of approximately 100 to 600 psig, and in the presence of silicon.

6. The method according to claim 1, wherein said reacting comprises introducing hydrochloric acid into a reaction vessel in which said reacting is carried out, and said reacting is carried out at a temperature of from 400 to 600° C., at a pressure of approximately 100 to 600 psig, and in the presence of silicon.

7. The method according to claim 1, wherein said impurities comprise phosphorus, arsenic, boron, aluminum, or a combination thereof.

8. The method according to claim 1, wherein said removing is carried out by at least one of:
producing an adduct of the impurities with an organic substance comprising an element having a lone electron-pair;
forming an Si—O—B bond or an Si—O—P bond in an atmosphere containing a very small amount of oxygen, wherein the impurities comprise at least one of boron and phosphorus;
contacting the impurities with a hydrated metal oxide gel;
contacting the impurities with an aqueous solution of an inorganic salt;
contacting the impurities with a fluoride salt of an alkali or alkaline earth element; and
reacting impurities that act as an electron donor or as an electron acceptor with benzaldehyde in the presence of a chlorosilane liquid having oxygen dissolved therein.

9. The method according to claim 1, wherein said removing is carried out by at least one of:
producing an adduct of the impurities with thiophenol or benzaldehyde;

forming an Si—O—B bond or an Si—O—P bond in an atmosphere containing a very small amount of oxygen, wherein the impurities comprise at least one of boron and phosphorus;

contacting the impurities with a hydrated silica gel or alumina gel;

contacting the impurities with an aqueous solution of $TiCl_4$ or $FeCl_3$;

contacting the impurities with a fluoride salt of an alkali or alkaline earth element; and reacting impurities that act as an electron donor or as an electron acceptor with benzaldehyde in the presence of a chlorosilane liquid having oxygen dissolved therein.

* * * * *